Aug. 13, 1940.   W. T. CALDWELL   2,211,456
INTERNAL PRESSURE PISTON
Filed March 2, 1938
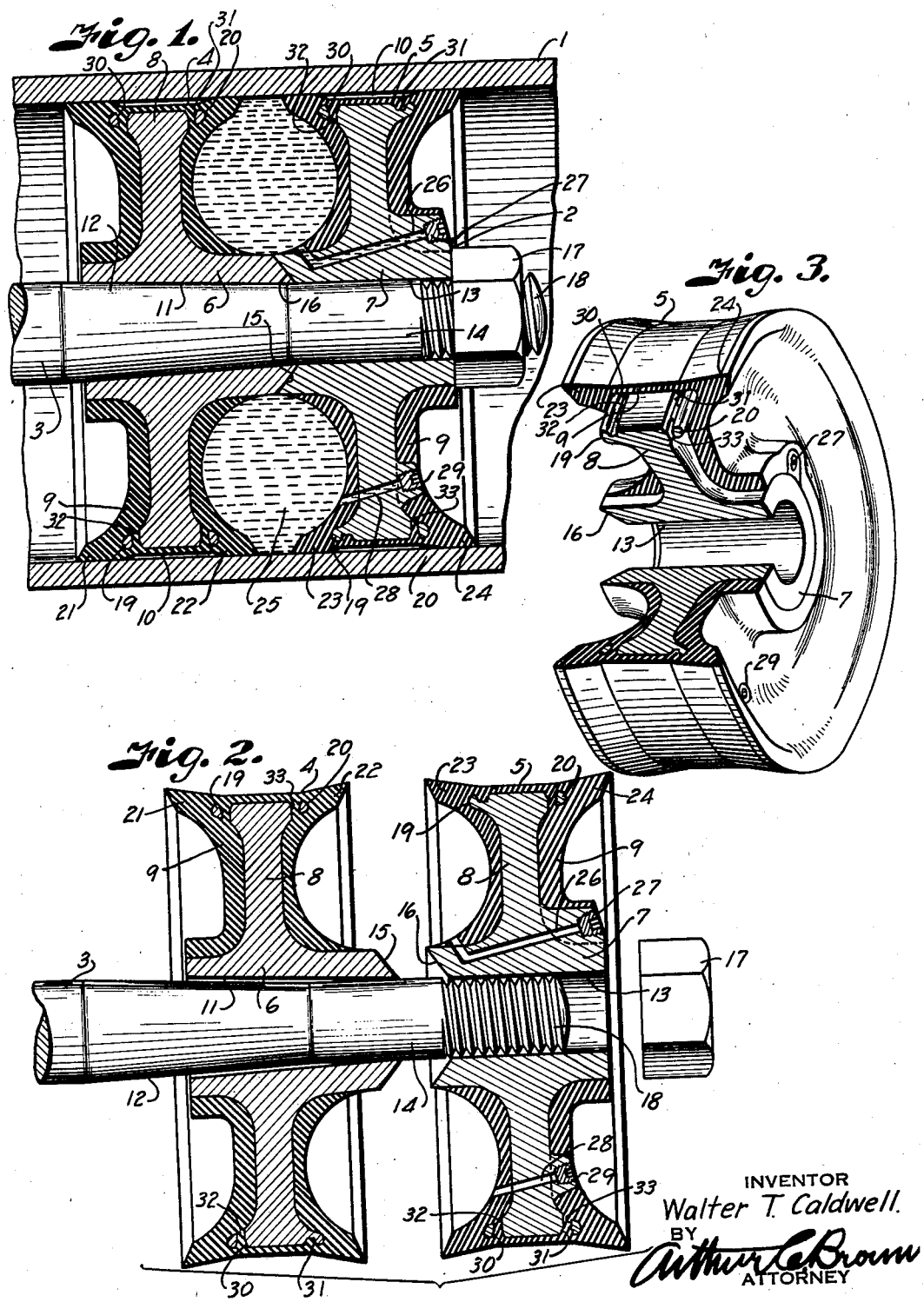
INVENTOR
Walter T. Caldwell.
BY Arthur L. Brown
ATTORNEY Patented Aug. 13, 1940

2,211,456

UNITED STATES PATENT OFFICE 2,211,456

INTERNAL PRESSURE PISTON

Walter T. Caldwell, Enid, Okla., assignor to The George E. Failing Supply Company, Enid, Okla., a corporation of Oklahoma Application March 2, 1938, Serial No. 193,480

5 Claims. (Cl. 309—23)

This invention relates to pistons, particularly those for use in double acting pumps, hydraulic jacks and like devices, and has for its principal objects to provide a piston with a packing element having oppositely directed sealing lips, and to provide a piston equipped with spaced packing elements cooperating to form an annular chamber for containing a lubricant or sealing medium.

It is also an important object of the invention to provide the packing elements with soft resilient lips which are acted upon by the sealing medium so that when leakage occurs past one of the elements, yielding of the flexible lip thereon imparts pressure upon the sealing medium to enhance sealing engagement of the complementary lip on the other packing element with the wall of the cylinder and vice versa.

A further object of the invention is to provide an improved mounting of the packing elements on the piston rod to prevent internal leakage through the piston assembly.

In accomplishing these and other objects of the invention, as hereinafter pointed out, I have provided improved details of structure, the preferred form of which is illustrated in the accompanying drawing, wherein:

Fig. 1 is a longitudinal section through a portion of a pump cylinder or the like equipped with a piston constructed in accordance with the present invention, the piston also being shown in section.

Fig. 2 is a section of the parts composing the piston, shown in spaced relation and removed from the cylinder to better illustrate the normal shapes of the packing elements.

Fig. 3 is a perspective view of one of the packing elements, a part of which is broken away to better illustrate its construction.

Referring more in detail to the drawing:

1 designates a portion of a cylinder for a pump, hydraulic jack, or similar device, wherein fluid is acted upon by a piston 2 under high working pressure as in the case of a pump or wherein high pressure fluid operates the piston, as in the instance of a hydraulic jack.

The piston 2 is mounted upon a piston rod 3 and includes a pair of ring-like packing elements 4 and 5, each including a hub 6 and 7 carrying peripheral portions 8 of smaller diameter than the cylinder to form a backing for a resilient material 9 that is vulcanized thereto or otherwise attached so that the resilient material forms an integral part of the rings. The resilient covering 9 for the peripheries 8 is of such thickness as to leave an annular space about these portions as shown at 10. The hub 6 of the ring 4 has a tapered bore 11 for engaging a tapered portion 12 of the rod 3, while the hub 7 of the other ring has a cylindrical bore 13 sleeved over a reduced cylindrical extension 14 on the rod. The abutting or facing ends of the hubs are of sufficient length to provide an annular reservoir space between the disk portions 8.

In order to prevent leakage between the abutting ends of the hubs, the hub 6 is provided with a bevelled end face 15 that engages within a bevelled recess 16 of the other hub, as clearly shown in Fig. 1. When the rings are in position on the rod, they are retained by a nut 17 that is mounted on a threaded extension 18 of the cylindrical end 14. The peripheries of the disk portions 8 have laterally extending flanges 19 and 20, extending from the respective sides thereof, and which substantially correspond with the outer shape of the resilient facing and are constructed to enhance attachment of the facings to the body members of the rings. The resilient material is shaped to provide opposed outwardly flaring sealing lips 21—22 for the ring 4 and 23—24 for the ring 5, the lips being slightly compressed from peripheral points aligning with the terminal edges of the flanges 19 and 20 when the piston is inserted in the cylinder to sealingly engage with the wall thereof, as shown in Fig. 1.

The inner or facing lips 22—23 cooperate with the facings on the inner sides of the disk portions to form a lubricant containing chamber of substantially circular cross-section. The lips are reduced in thickness toward the terminal edges thereof so that the edges are extremely flexible and movable responsive to pressure imparted upon a lubricant or sealing medium, indicated at 25.

The sealing medium 25 is inserted in the chamber after assembly of the piston and its insertion into the cylinder by way of a channel 26 that is provided in the hub 7 and which normally has its outer end closed by a plug 27 to retain the lubricant. In order to allow complete filling of the chamber, the disk portion 9 is provided with a vent channel 28 that is normally closed by a threaded plug 29. In filling the chamber the plugs are removed and the lubricant or sealing medium is applied by means of a grease gun, or the like, that is connected with the channel 26, the air in the chamber escaping through the other channel 28. A sufficient amount of lubricant or pressure medium is inserted to completely fill the chamber so that yieldability of one of the lips 22 or 23 will apply sealing pressure on the other lip through the pressure medium.

In order to secure attachment of the resilient facing to the disk portions, the flanges 19 and 20 are grooved peripherally as indicated at 30 and 31, and provided with series of radial openings 32 and 33 into and through which the resilient material extends to form a positive tie, as best shown in Figs. 1 and 2.

It is apparent that should leakage occur past one of the packing rings, the inner flexible lip for that ring will yield to impart pressure on the lubricant which enhances the pressure seal of the other lip to prevent the leakage from passing from one end of the piston to the other.

In case the piston structure is used in a pump handling gritty materials, such as the drilling fluid used in rotary drilling operations, the grit normally tends to work in between the packing rings and the cylinder as the piston is reciprocated therein. A particle of grit or sand tending to pass one of the rings, causes deflection of the sealing lip on the other ring by way of the pressure medium so that it is impossible for the particle of sand or grit to work under the piston. The sand or the like will usually work into the internal pressure chamber and be trapped therein.

The outer lips 21 and 24 of the respective rings cooperate with the inner lips 22 and 23 to effect seal with the face of the cylinder. For example, the outer sealing lips are directly exposed to the pressure medium acting upon the respective ends of the piston so that a primary seal is effected by direct action of the pressure medium, while the inner lips 22 and 23 are indirectly acted upon by the pressure medium. The inner lips are, therefore, protected from abrasive action of any granular material contained in the pressure medium and are kept substantially clean for contact with the surface of the cylinder. Since the inner lips are located adjacent the sealing medium 25, they are adequately lubricated thereby to reduce wear on the piston and cylinder surfaces.

What I claim and desire to secure by Letters Patent is:

1. A piston including a pair of packing rings each having primary and secondary annular sealing lips, means for retaining said packing rings in concentric alignment with the secondary sealing lips in facing relation, hubs spacing said packing rings to form an annular pressure chamber between said rings, and a pressure transmitting fluid completely filling the pressure chamber.

2. A piston including a pair of packing rings each having primary and secondary annular sealing lips, means for retaining said packing rings in concentric alignment with the secondary sealing lips in facing relation, hubs spacing said packing rings to form an annular pressure chamber between said rings, and a substantially liquid sealing medium completely filling said chamber for exerting pressure on the secondary sealing lips.

3. A piston of the character described including packing elements having oppositely directed primary and secondary flexible lip portions on each of said elements for engaging the wall of a cylinder and having hub portions for spacing the secondary lip portions to provide a pressure chamber, a pressure transmitting fluid completely filling said chamber, and means for retaining the hub portions of said packing elements in abutting engagement.

4. A piston of the character described including a pair of packing elements having rigid body portions and primary and secondary flexible sealing lips adapted for sealingly contacting the surface of a cylinder in which the piston is installed, means spacing said packing elements and cooperating with said secondary sealing lips and surface of the cylinder to form a confined pressure chamber between said packing elements, and a pressure transmitting fluid completely filling said chamber.

5. A piston of the character described including a pair of packing elements having rigid body portions and primary and secondary flexible sealing lips adapted for sealingly contacting the surface of a cylinder in which the piston is installed, means spacing said packing elements and cooperating with said secondary sealing lips and surface of the cylinder to form a confined pressure chamber between said packing elements, and a liquid completely filling said chamber.

WALTER T. CALDWELL.